United States Patent
Choi et al.

(10) Patent No.: US 10,263,864 B2
(45) Date of Patent: Apr. 16, 2019

(54) APPARATUS AND METHOD FOR COLLECTING ADAPTIVE FLOW STATISTICS DATA IN CARRIER NETWORK

(71) Applicant: ELECTRONICS AND TELECOMMUNICATIONS RESEARCH INSTITUTE, Daejeon (KR)

(72) Inventors: Tae Sang Choi, Daejeon-si (KR); Chung Lae Cho, Daejeon-si (KR); Young Hwa Kim, Daejeon-si (KR); Sang Sik Yoon, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 148 days.

(21) Appl. No.: 15/235,531

(22) Filed: Aug. 12, 2016

(65) Prior Publication Data
US 2017/0048118 A1    Feb. 16, 2017

(30) Foreign Application Priority Data

Aug. 13, 2015  (KR) .................. 10-2015-0114909
Oct. 28, 2015  (KR) .................. 10-2015-0150209

(51) Int. Cl.
*H04L 12/26* (2006.01)
*H04L 29/06* (2006.01)

(52) U.S. Cl.
CPC .......... *H04L 43/062* (2013.01); *H04L 43/024* (2013.01); *H04L 43/04* (2013.01)

(58) Field of Classification Search
CPC .................. H04L 43/062; H04L 69/28
See application file for complete search history.

(56) References Cited

U.S. PATENT DOCUMENTS 7,782,793 B2 * 8/2010 Olesinski ............ H04L 41/0893
                                                 370/253
8,300,525 B1 * 10/2012 Kohn .................... H04L 43/022
                                                 370/230
(Continued)

FOREIGN PATENT DOCUMENTS

EP           1764951 B1     11/2011
KR   10-2005-0100470 A     10/2005
KR   10-2015-0068916 A      6/2015

OTHER PUBLICATIONS

Gagandeep Garg et al. "Detecting anomalies efficiently in SDN using adaptive mechanism", 2015 Fifth International Conference on Advanced Computing & Communication Technologies, pp. 367-370, Feb. 21-22, 2015.

*Primary Examiner* — Rasheed Gidado
(74) *Attorney, Agent, or Firm* — LRK Patent Law Firm (57) ABSTRACT

An apparatus for collecting adaptive flow statistics data includes a node type collector to access a network node and collect flows; a flow type calculator to calculate two or more flow types according to a flow duration length and request the node type collector to collect flow statistics data of a corresponding type of a flow at every collection period that corresponds to each of the two or more flow types; and a flow statistics storage to store the two or more flow types calculated by the flow type calculator, and store the flow statistics data, collected by the node type collector, for each of the two or more flow types in a table.

15 Claims, 7 Drawing Sheets

(56) References Cited

U.S. PATENT DOCUMENTS

| | | | | |
|---|---|---|---|---|
| 8,811,172 B1* | 8/2014 | Sella | ............... | H04L 41/12 |
| | | | | 370/227 |
| 9,462,008 B2* | 10/2016 | Bartos | ............... | H04L 63/1416 |
| 9,544,203 B2* | 1/2017 | Bei | ............... | H04L 43/026 |
| 2005/0195740 A1* | 9/2005 | Kwon | ............... | H04L 43/0882 |
| | | | | 370/229 |
| 2015/0195174 A1 | 7/2015 | Kogami | | |
| 2015/0287311 A1* | 10/2015 | Smith | ............... | G08B 19/00 |
| | | | | 340/521 |
| 2017/0195240 A1* | 7/2017 | Chen | ............... | H04L 47/2483 |

* cited by examiner

APPARATUS AND METHOD FOR COLLECTING ADAPTIVE FLOW STATISTICS DATA IN CARRIER NETWORK

CROSS-REFERENCE TO RELATED APPLICATION(S)

This application claims priority to Korean Patent Application Nos. 10-2015-0114909, filed Aug. 13, 2015, and 10-2015-0150209, filed Oct. 28, 2015, in the Korean Intellectual Property Office, the entire disclosures of which are incorporated herein by references for all purposes.

BACKGROUND

1. Field

The following description relates to a carrier network, and more specifically, to an apparatus and method for collecting traffic flow statistics data.

2. Description of the Related Art

A carrier network refers to the one that is operated by a large-scale wired/wireless communications provider, such as a cloud data center, a large enterprise network, and a wired/wireless telecom service provider network. There are tens of thousands to hundreds of thousands of network devices required to be managed, e.g., a router and a switch. In order to collect traffic statistics information in these large-scale networks, it is fundamentally important to secure expandability, along with accuracy.

In addition, due to the characteristics of a carrier network composed of a software-defined network (SDN) and a large-scale wired/wireless network that includes a network function virtualization (NFV), there are various heterogeneous network devices, and solutions applicable thereto in common are required.

However, in most of the recent technologies of collecting traffic flow statistics data, solutions, which simultaneously satisfy three conditions of the above-mentioned expandability, accuracy, and heterogeneous independence, do not exist. In other words, only the following solutions exist: a solution that guarantees expandability using a sampling; a solution that guarantees the accuracy by collecting all the flow statistics data without the sampling, but has difficulties in guaranteeing the expandability for a large-scale network; or a solution of a format that cannot accept a heterogeneous network device.

SUMMARY

The following disclosure provides an apparatus and method for collecting adaptive flow statistics data in a carrier network to guarantee expandability, accuracy, and heterogeneous independence at the same time.

In one general aspect, an apparatus for collecting adaptive flow statistics data include: a node type collector to access a network node and collect flows; a flow type calculator to calculate two or more flow types according to a flow duration length and request the node type collector to collect flow statistics data of a corresponding type of a flow at every collection period that corresponds to each of the two or more flow types; and a flow statistics storage to store the two or more flow types calculated by the flow type calculator, and store the flow statistics data, collected by the node type collector, for each of the two or more flow types in a table.

In another general aspect, a method of collecting adaptive flow statistics data include: calculating two or more flow types according to a flow duration length; collecting flow statistics data of a corresponding type of a flow at every collection period that corresponds to each of the two or more flow types; and storing the collected flow statistics data for each of the two or more flow types in a table.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Terms used throughout this specification are defined. These terms are defined in consideration of functions according to exemplary embodiments, and can be varied according to a purpose of a user or manager, or precedent and so on. Therefore, definitions of the terms should be made on the basis of the overall context.

Figure 1:
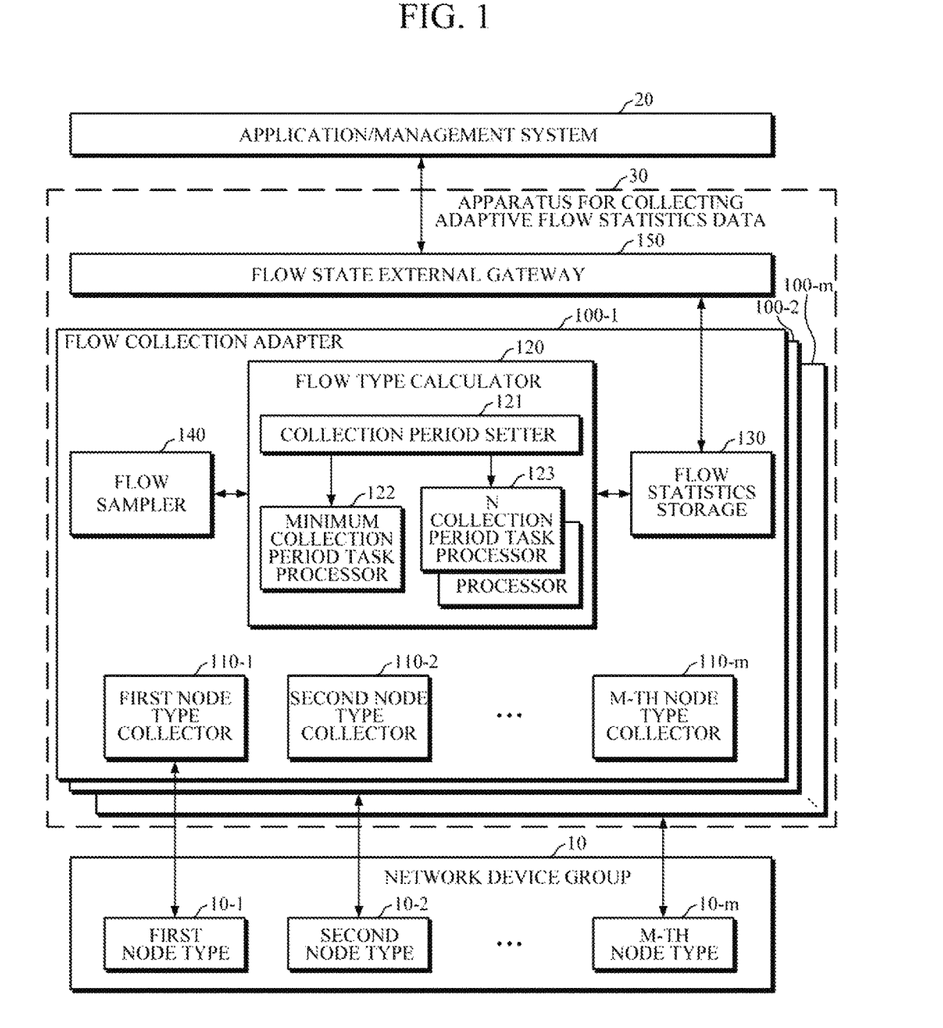
FIG. 1 is a diagram illustrating a constitution of a system including an apparatus for collecting adaptive flow statistics data in a carrier network according to an exemplary embodiment.

FIG. 1 is a diagram illustrating a constitution of a system including an apparatus for collecting adaptive flow statistics data in a carrier network according to an exemplary embodiment.

Referring to FIG. 1, an apparatus 30 for collecting adaptive flow statistics data in a carrier network provides an application/management system 20 with flow statistics data that is collected from a network device group 10.

Here, the network device group 10 refers to various types of network devices used in a wired/wireless carrier network, where traffic flows are collected. For example, the wired network device may include, for example, equipment of a router and a switch; and the wireless network device may include a Wi-Fi access pointer, a mobile communications switching device, a network device for mobile communications core, an OpenFlow switch that supports a software-defined network (SDN), and a virtual OpenFlow switch, etc. Thus, according to an exemplary embodiment of the present application, the network device group 10 may be classified to various types of nodes 10-1, 10-2, . . . , 10-*m* based on its form, which is then managed.

In one exemplary embodiment, the network device is capable of supporting a function of calculating traffic statistics data for each flow. The function calculates the statistics data by using a standard method, e.g., Netflow, in an existing router or switch device; or calculates statistics data of each flow internally in an OpenFlow switch. A device that does not support such a method may calculate the statistics data of each flow in its own or another manner.

The application/management system 20 includes: various applications that need traffic flow statistics data; a legacy management system, such as network management system (NMS)/operations support system (OSS); a management system for software-defined network (SDN)/network function virtualization (NFV), and the like. Here, the application may, for example, traffic engineering, a traffic distributor for service chaining, a network security and charging, etc.

The apparatus 30 specifically includes two or more flow collection adapters 100-1, 100-2, . . . 100-*m* and a gateway 150.

The flow collection adapters 100-1, 100-2, . . . , 100-*m* access one of the heterogeneous network node types and collect flows generated from the accessed node type. For example, in the case where a network node to be collected is an OpenFlow switch, the node type collectors, which support an OpenFlow protocol, collect the flows from the OpenFlow switch, among the node type collectors 110-1, 110-2, . . . , 110-*m* that are included in the flow collection adapters 100-1, 100-2, . . . , 100-*m*. In addition, in the case where the network node for the collection is a router or switch, the node type collectors, which support Netflow, collect the flows from the router or switch, among the node type collectors 110-1, 110-2, . . . , 110-*m* included in the flow collection adapters 110-1, 1002, . . . , 100-*m*.

The flow collection adapters 100-1, 100-2, . . . , 100-*m* may specifically include the two or more node type collectors 110-1, 110-2, . . . , 110-*m*, a flow type calculator 120, a flow statistics storage 130, and a flow sampler 140.

The two or more node type collectors 110-1, 110-2 . . . , 110-*m* access one of the heterogeneous network node types and collect flows generated from the accessed node type. In other words, according to a request from the flow type calculator 120, the two or more node type collectors 110-1, 110-2, . . . , 110-*m* access the network device group 10, collect flow statistics data, and store the collected flow statistics data in the flow statistics storage 130. The flow type calculator 120 calculates two or more flow types according to a flow length, and requests to collect flow statistics data of the corresponding types to the node type collectors 110-1, 110-2, . . . , 110-*m* at every collection period that corresponds to each of the two or more flow types. In other words, making a collection period different according to the flow type may make the statistics data collection period longer with regard to the long-lasting flow. Accordingly, the present application may improve the performance in collecting the flows.

Here, the collection period may include a minimum collection period and one or more collection periods that are multiplied by the minimum collection period. For example, in the case where there are three collection periods, the minimum collection period is s; an intermediate-length collection period, s*m; the longest-length collection period, s*l; and the entire collection period, s*m*l.

In addition, one of the essential features of the present application is that among all the present flows, an immediate flow indicates the one that is generated and finished within a range of the minimum period, and does not collect the corresponding immediate flows at every collection. Such an immediate flow relates to most of the traffics flowing at present in the network device 10, and has an advantage of solving a performance guaranteeing problem and an expandability problem at the same time.

The flow sampler 140 provides a sampling flow set, and performs a function of sampling not all the flows but a part of the flows to increase a collection efficiency when collecting the flows of each type calculated by the flow type calculator 120. Here, as the sampling method, various sampling algorithms may be used, including random, top-n, statistical methods, etc.

When the sampling is needed, the flow type calculator 120 requests the flow sampler 140 to sample a type flow corresponding to a collection period at every collection period that corresponds to each of the two or more types. Once the flow type calculator 120 receives, from the flow sampler 140, the sampling set regarding the type flow corresponding to the collection period, the flow type calculator 120 requests to collect flow statistics data regarding the sampling set corresponding to the collection period to the node type collectors 110-1, 110-2, . . . , 110-*m*.

The flow type calculator 120 sets timers corresponding, respectively, to the two or more collection periods, and as the timers wake up, the flow type calculator 120 performs in parallel the two or more tasks corresponding, respectively, to the two or more collection periods. In other words, referring to FIG. 1, the flow type calculator 120 may include a collection period setter 121, a minimum collection period task processor 122, and one or more n collection period task processors 123. Here, for convenience of description, the collection periods excluding the minimum collection period may be referred to as 'n collection period'. For example, if there are three collection periods, the intermediate length or the longest length may be classified into the n collection period. As the set timers wake up as described above, the minimum collection period task processor 122 and the one or more n collection period task processors 123 each request a flow collection adapter 110 to collect the flow statistics data.

However, in the case where the present collection period is the initial collection period, the minimum collection period task processor 122 requests the node type collectors 110-1, 110-2, . . . , 110-*m* to collect the statistics data regarding all the flow types.

In addition, in the case where the present collection period is the entire collection period having a common multiple of two or more collection periods, the minimum collection period task processor 122 requests the node type collectors 110-1, 110-2, . . . , 110-*m* to collect the statistics data regarding all the flow types. Then, since the minimum collection period task processor 122 performs the collection operation regarding all the flow types in the entire collection period, the one or more n collection period task processors 123 omits the collection operation. Here, it has been described that the minimum collection period task processor 122 performs the collection operation regarding all the flow types in the entire collection period, but an exemplary embodiment thereof is not limited thereto. That is, it is required for any one of the minimum collection period task processor 122 and the one or more n collection period task processors 123 to perform the collection operation regarding all the flow types.

The flow statistics storage 130 stores the two or more flow types that are calculated by the flow type calculator 120, and stores the flow statistics data, collected by the node type collectors 110-1, 110-2, . . . , 110-*m*, for each of the two or more flow types in a table. Also, the flow statistics storage 130 performs a flow storage life cycle management, such as correction, search, and removal.

In response to the request from an external application or a management system, the gateway 150 transfers the flow statistics data that is searched for by the flow statistics storage 130. That is, the gateway 150 performs the role as an external interface of the apparatus 30.

Figure 2:
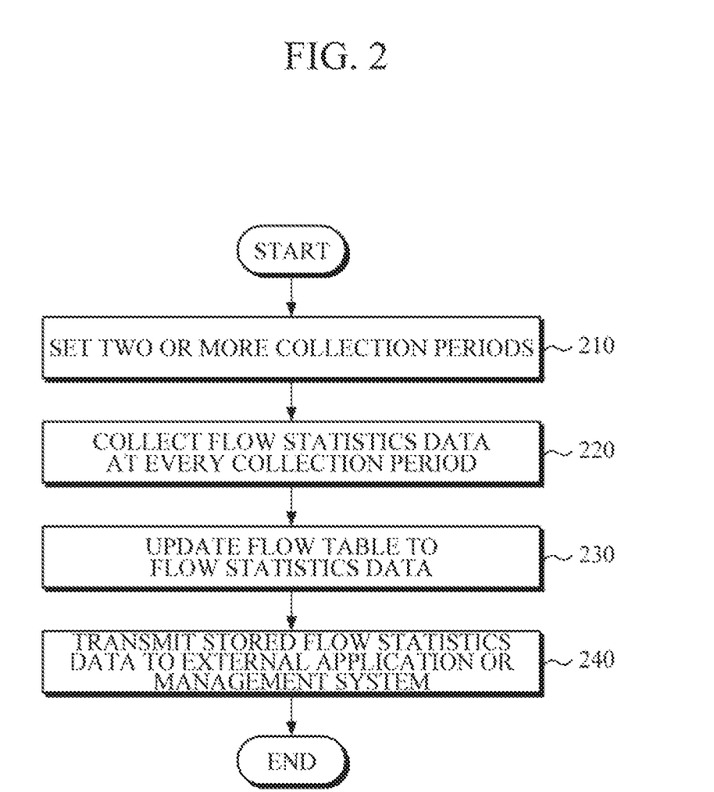
FIG. 2 is a flowchart illustrating a method of collecting adaptive flow statistics data in a carrier network according to an exemplary embodiment.

FIG. 2 is a flowchart illustrating a method of collecting adaptive flow statistics data in a carrier network according to an exemplary embodiment.

Referring to FIG. 2, an apparatus 30 for collecting adaptive flow statistics data (hereinafter referred to as 'apparatus') calculates two or more flow types according to a flow duration length, and two or more collection periods corresponding thereto in 210. Here, there may be two or more collection periods, and initial values regarding types of the flow, e.g., short, intermediate, long, and the entire collection period are set to be defaults. The two or more collection periods include the minimum collection period and one or more collection periods that are multiplied by the minimum collection period. The apparatus 30 sets up the tasks that will be executed at each period, with the tasks being synchronized with the timers.

Then, the apparatus 30 collects flow statistics data of the corresponding type at every collection period corresponding to each of the two or more flow types in 220.

Then, the apparatus 30 stores the collected flow statistics data by each of the two or more flow types in a table form in 230, and transfers the stored flow statistics data in response to a request from an external application or a management system in 240.

Figure 3A:
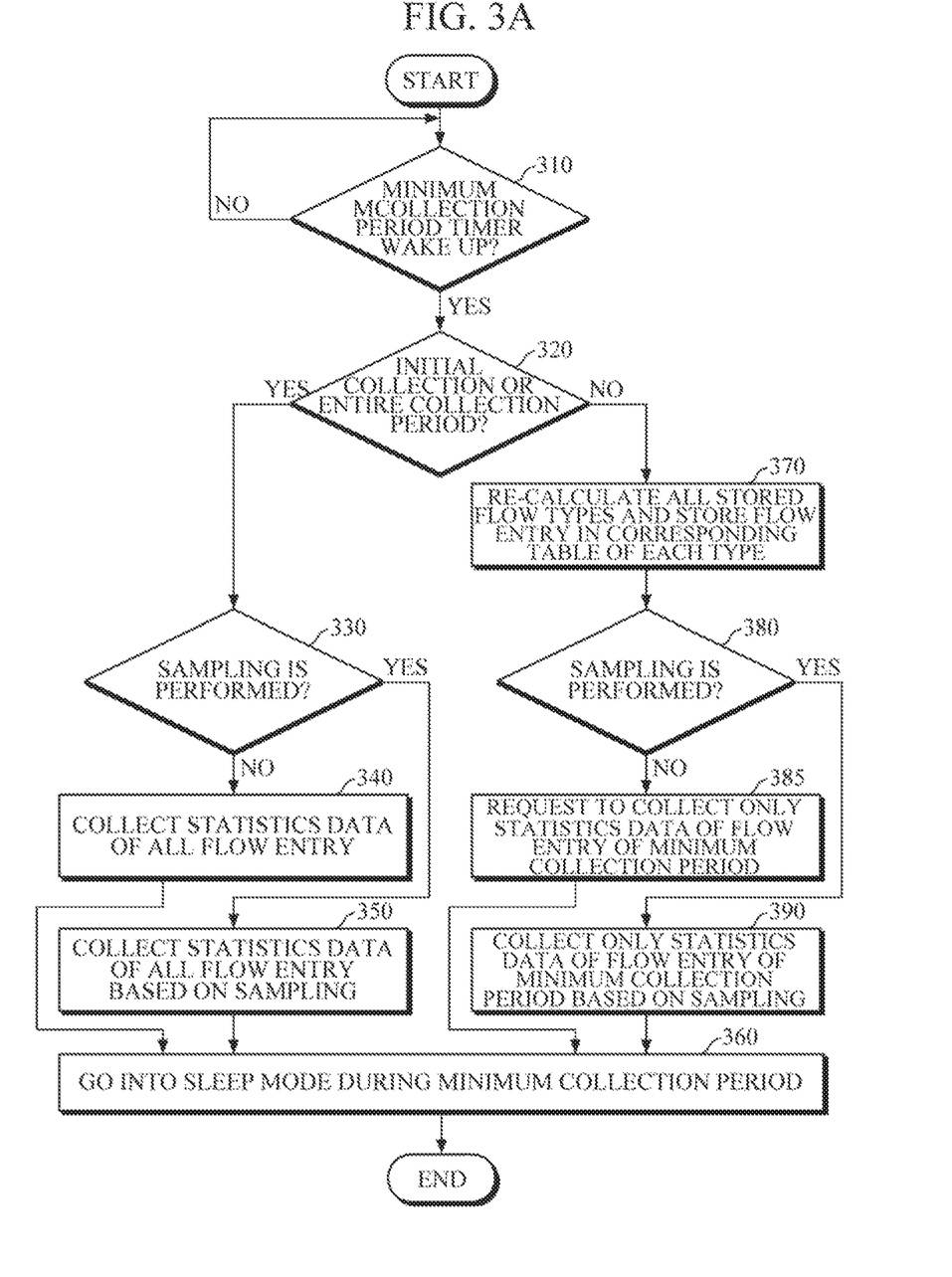
FIGS. 3A to 3C are diagrams, according to an exemplary embodiment, illustrating tasks according to a minimum collection period.
Figure 3B:
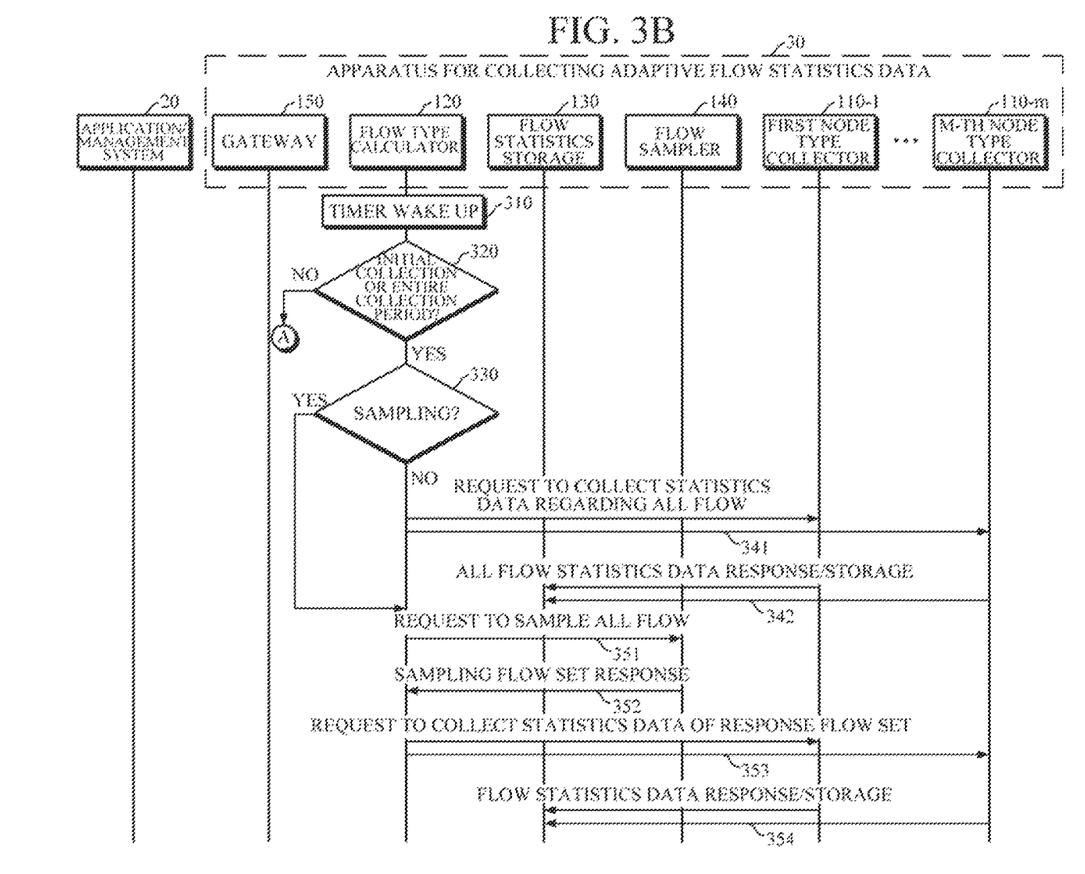
Figure 3C:
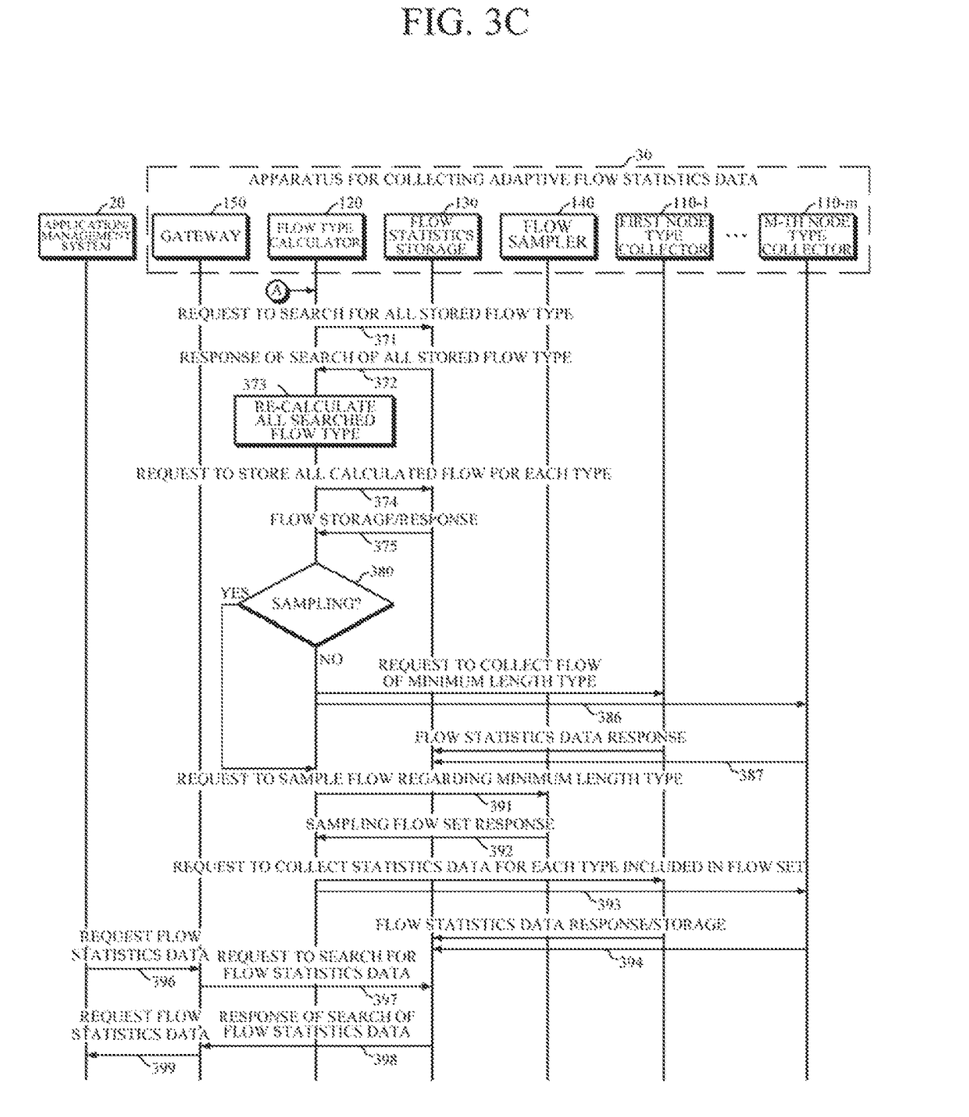

FIGS. 3A to 3C are diagrams, according to an exemplary embodiment, illustrating tasks according to a minimum collection period. FIG. 3A is a flowchart illustrating a task operation, performed by a flow type calculator 120, according to a minimum collection period. FIGS. 3B and 3C illustrate signal flows between internal components of an apparatus 30 for performing tasks according to a minimum collection period.

Referring to FIGS. 3A and 3B, the flow type calculator 120 of the apparatus 30 monitors whether the minimum collection period timer wakes up in 310. In response to the monitoring 310, if the minimum collection period timer wakes up, the flow type calculator 120 executes the minimum collection period task processor 122. The minimum collection period task processor 122 determines whether this time is an initial collection or entire collection period in 320.

In response to the determination in 320, if this time is the initial collection or entire collection period, the flow type calculator 120 determine whether sampling is performed in 330.

In response to the determination in 330, if the sampling is not performed, the flow type calculator 120 requests to collect statistics data of all flow entries in 340. That is, the flow type calculator 120 requests node type collectors 110-1, 110-2, . . . , 110-*m* to collect statistics data regarding all the flows in 341, and then the node type collectors 110-1, 110-2, . . . , 110-*m* collect the statistics data regarding all the flows and store it in statistics storage 130 in 342.

Otherwise, in response to the determination in 330, if the sampling is performed, the flow type calculator 120 requests to collect statistics data of all flow entries based on the sampling in 350. That is, the flow type calculator 120 requests the flow sampler 140 to sample all the flows in 351, and then flow sampler 140 generates and transfers a sampling set regarding all the flows to the flow type calculator 120 in 352. Then, the flow type calculator 120 requests the node type collectors 110-1, 110-2, . . . , 110-*m* to collect the statistics data of the sampling flow set in 353, and then the node type collectors 110-1, 110-2, . . . , 110-*m* collect the statistics data of the sampling flow set and store it in the flow statistics storage 130 in 354. Then, the minimum collection period task processor 122 goes into sleep mode during the minimum collection period in 360.

Meanwhile, in response to the determination in 320, if this time is not the initial collection or entire collection period, the minimum collection period task processor 122 calculates again all the stored flow types and stores the flow entries in the corresponding table of each type in 370 with reference to FIGS. 3A and 3C. That is, in response to the operation 371 of requesting the flow statistics storage 130 to search for all the stored flows, if the flow type calculator 120 receives a response of all the stored flow search information in 372, the flow type calculator 120 calculates again the flow types regarding all the present flows of each type in 373. Then, the flow type calculator 120 requests the flow statistics storage 130 to store all the newly calculated flows for each flow type in 374, and then the flow statistics storage 130 responds to the request in 375.

Then, the minimum collection period task processor 122 determines whether the sampling is performed in 380. In response to the determination in 380, if the sampling is not performed, the minimum collection period task processor 122 requests to collect the statistics data of flow entries of the minimum collection period in 390. That is, the flow type calculator 120 requests a flow collection adapter 110 to collect the statistics data regarding a minimum length type of flow in 386, and then node type collectors 110-1, 110-2, . . . , 110-*m* collect the statistics data regarding the minimum length type of flow and store it in the flow statistics storage 130 in 387.

Otherwise, in response to the determination 380, if the sampling is performed, the minimum collection period task processor 122 requests to collect only the statistics data of flow entries of the minimum collection period based on the sampling in 385. That is, the flow type calculator 120 requests the flow sampler 140 to sample the minimum length flow in 391, and then the flow sampler 140 generates and transfers a sampling set regarding the minimum length type of flow to the flow type calculator 120 in 392. Then, the flow type calculator 120 requests the node type collectors 110-1, 110-2, . . . , 110-*m* to collect statistics data of the sampling flow set in 393, and then the node type collectors 110-1, 110-2, . . . , 110-*m* collect the statistics data of the sampling flow set and store it in the flow statistics storage 130 in 394. Then, the minimum collection period task processor 122 goes into sleep mode during the minimum collection period in 360.

Figure 4A:
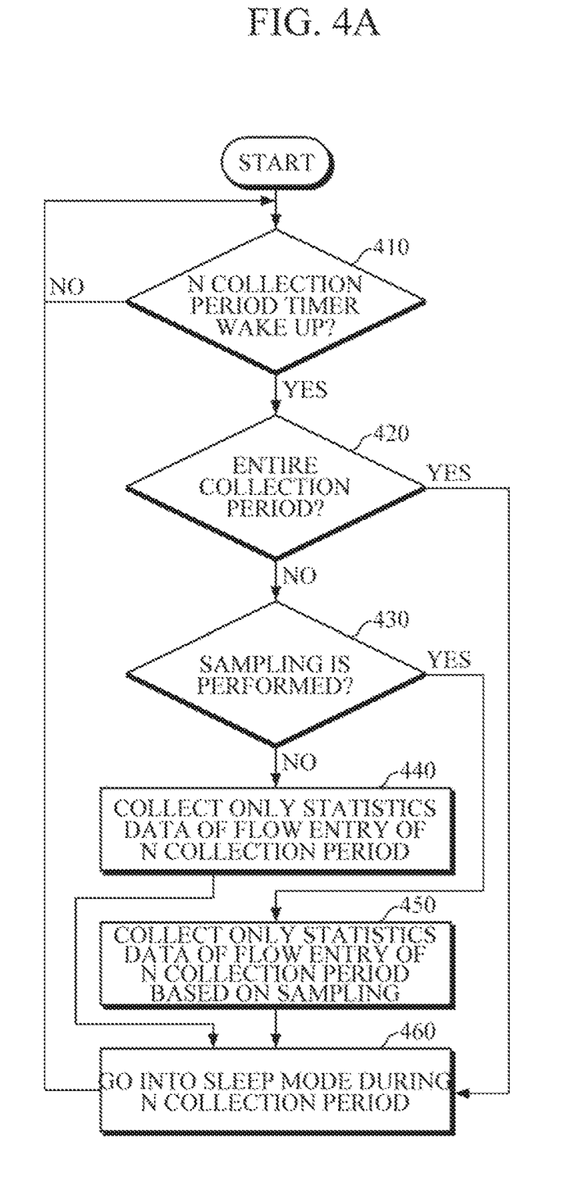
FIGS. 4A and 4B are diagrams, according to an exemplary embodiment, illustrating tasks according to an n collection period.
Figure 4B:
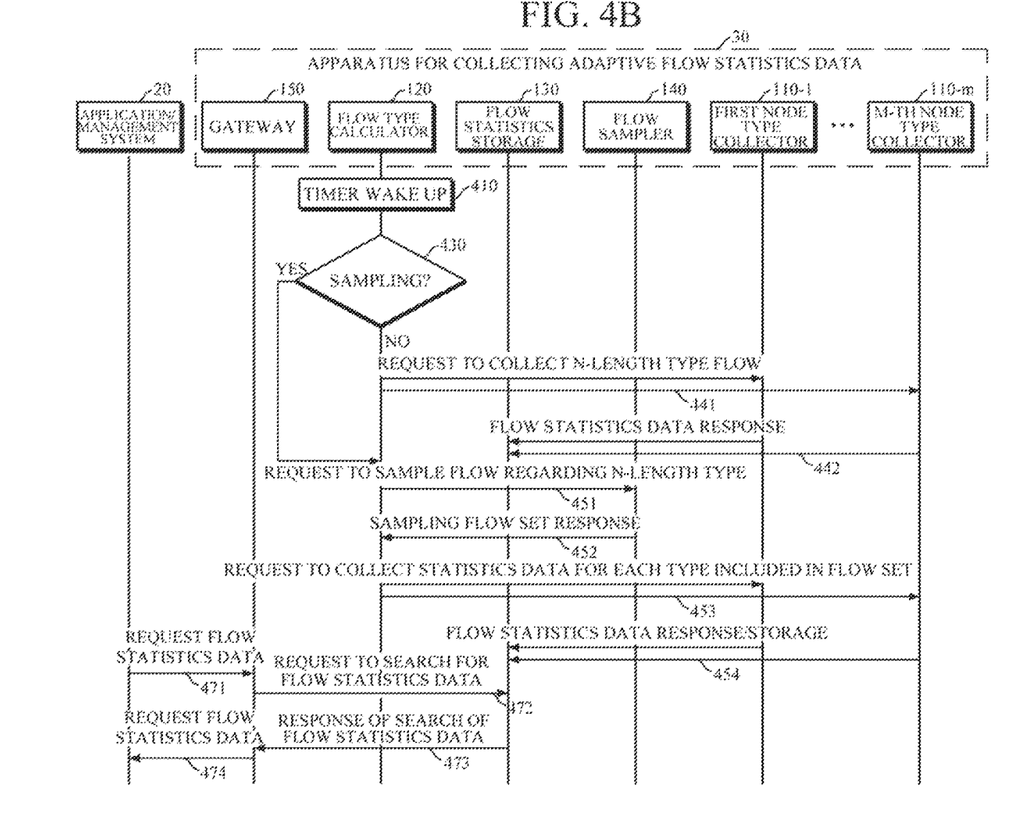

FIGS. 4A and 4B are diagrams, according to an exemplary embodiment, illustrating tasks according to an n collection period. FIG. 4A is a flowchart illustrating a task operation, performed by a flow type calculator 120, according to an n collection period. FIG. 4B illustrate signal flows between internal components of an apparatus 30 for performing tasks according to a minimum collection period.

Referring to FIGS. 4A and 4B, then collection period task processor 123 of the apparatus 30 monitors whether an n collection period timer wakes up in 410. In response to the monitoring in 410, if the n collection period timer wakes up, the n collection period task processor 123 determines whether this time is an entire collection period in 420. In response to the determination in 420, if this time is the entire collection period, the n collection period processor 123 omits the collection operation, and operation 460 is started. In other words, the minimum collection period task processors 122 collects statistics data regarding all the flow types.

Otherwise, to the determination in 420, if this time is not the entire collection period, the n collection period task processor 123 determines whether sampling is performed in 430.

In response to the determination in 430, if the sampling is not performed, the n collection period task processor 123 requests to collect statistics data of flow entries of the n collection period in 440. That is, the flow type calculator 120 requests the node type collectors 110-1, 110-2, ..., 110-m to collect the statistics data regarding a n-length type of flow in 441, and then the node type collectors 110-1, 110-2, ..., 110-m collect statistics data regarding the n-length type of flow and store it in the flow statistics storage 130 in 442.

Otherwise, in response to the determination in 430, if the sampling is performed, the n collection period task processor 123 requests to collect statistics data of flow entries of the n collection period based on the sampling in 450. That is, the flow type calculator 120 requests the flow sampler 140 to sample then-length type of flow in 451, and then the flow sampler 140 generates and transfers a sampling set regarding the n-length type of flow to the flow type calculator 120 in 452. Then, the flow type calculator 120 request the node type collectors 110-1, 110-2, ..., 110-m to collect statistics data of the sampling flow set in 453, and then request the node type collectors 110-1, 110-2, ..., 110-m collect the statistics data of the sampling flow set and store it in the flow statistics storage 130 in 454. Then, the n collection period task processor 123 goes into sleep mode during the n collection period in 460.

The present invention provides a flow statistical data collection mechanism, which is independent of expandability, accuracy, and network device types, thereby satisfying requests for various customers regarding service qualities, and having an effect of securing an advantageous position in attracting customers through a service differentiation from other business operators.

Accordingly, the present invention may apply to a performance, security, and charging management field of carrier networks of large-scale wired/wireless communications carriers, who need to collect traffic flow statistical data to secure the expandability, accuracy, and heterogeneous undependability. In addition to the carrier networks, the present invention may be applied to a network performance, security, and charging management field, such as a small-scale and existing software-defined cloud data center, a large enterprise, internet of things (IoT), etc.

What is claimed is:

1. An apparatus for collecting adaptive flow statistics data, the apparatus comprising:
   at least one collector, calculator, gateway and sampler being configured and executed by a processor using algorithm associated with a non-transitory flow statistics storage, the controller, calculator, gateway and sampler comprising,
   a node type collector configured to access a network node and collect flows; and
   a flow type calculator configured to calculate two or more flow types according to a flow duration length and request the node type collector to collect flow statistics data of a corresponding type of a flow at every collection period that corresponds to each of the two or more flow types, the collection period comprising a minimum collection period, an initial collection period, and an entire collection period,
   wherein the flow statistics storage is configured to store the two or more flow types calculated by the flow type calculator, and to store the flow statistics data, collected by the node type collector, for each of the two or more flow types in a table,
   wherein the gateway is configured to transfer the flow statistics data that is searched for by the flow statistics storage in response to a request from an external application or a management system that manages traffic, and
   wherein the flow types includes an immediate flow which is generated and finished within a range of a minimum period, and in the minimum collection period the flow type calculator does not collect the immediate flow.

2. The apparatus of claim 1, wherein the node type collector comprises two or more node type collectors configured to access one of heterogeneous network node types and to collect flows that are generated in the accessed node type.

3. The apparatus of claim 1, further comprising:
   an adaptive flow sampler configured to provide a sampling flow set; and
   the flow type calculator is configured to request the adaptive flow sampler to sample a type flow corresponding to the collection period at every collection period that corresponds to each of the two or more flow types, and
   in response to receipt of the sampling flow set regarding the type flow corresponding to the collection period from the adaptive flow sampler, the flow type calculator is configured to request the node type collector to collect the flow statistics data regarding the sampling flow set corresponding to the collection period.

4. The apparatus of claim 1, wherein the collection period comprises the minimum collection period and one or more collection periods that are multiplied by the minimum collection period.

5. The apparatus of claim 4, wherein in a case where there are three collection periods, the collection period comprises the minimum collection period 's', an intermediate-length collection period 's*m', and a longest-length collection period 's*l',
   wherein 'm' indicates a positive integer determined according to a flow type and 'l' indicates a positive integer higher than 'm' determined according to the flow type.

6. The apparatus of claim 1, wherein in a case where a present collection period is the minimum collection period among two or more collection periods and is also the initial collection period, the flow type calculator is configured to request the node type collector to collect the flow statistics data regarding all the flow types.

7. The apparatus of claim 1, wherein in a case where a present collection period is an entire collection period having a common multiple of two or more collection periods, the flow type calculator is configured to request the node type collector to collect the flow statistics data regarding all the flow types.

8. The apparatus of claim 1, wherein the flow type calculator is configured to set timers corresponding, respectively, to two or more collection periods, and as the timers wake up, perform in parallel two or more tasks corresponding, respectively, to the two or more collection periods.

9. The apparatus of claim 8, wherein in a case where a present collection period is an entire collection period having a common multiple of a minimum collection period and one or more collection periods that are multiplied by the minimum collection period, only one of the two or more tasks is to request the node type collector to collect the flow statistics data regarding all the flow types.

10. A method of collecting adaptive flow statistics data, the method comprising:
- calculating two or more flow types according to a flow duration length;
- collecting flow statistics data of a corresponding type of a flow at every collection period that corresponds to each of the two or more flow types, the collection period comprising a minimum collection period, an initial collection period, and an entire collection period;
- storing the collected flow statistics data for each of the two or more flow types in a table; and
- transferring the stored flow statistics data in response to a request from an external application or a management system that manages traffic,
- wherein the flow types includes an immediate flow which is generated and finished within a range of a minimum period, and in the minimum collection period the immediate flow is not collected.

11. The method of claim 10, wherein the collecting of the flow statistics data comprises:
- accessing one of heterogeneous network node types and individually collecting flows that are generated in the accessed node type.

12. The method of claim 10, wherein the collecting of the flow statistics data comprises:
- acquiring a sampling set regarding a type flow corresponding to the collection period at every collection period that corresponds to each of the two or more flow types; and
- collecting the flow statistics data regarding the sampling set corresponding to the collection period.

13. The method of claim 10, wherein the collection period comprises the minimum collection period and one or more collection periods that are multiplied by the minimum collection period; and
- in a case where a present collection period is the minimum collection period among two or more collection periods and is also the initial collection period, the collecting of the flow statistics data comprises collecting the flow statistics data regarding all the flow types.

14. The method of claim 10, wherein the collection period comprises the minimum collection period, and one or more collection periods multiplied by the minimum collection period; and
- in a case where a present collection period is an entire collection period having a common multiple of two or more collection periods, the collection of the flow statistics data comprises collecting the flow statistics data regarding all the flow types.

15. The method of claim 10, wherein the collecting of the flow statistics data comprises:
- setting timers corresponding, respectively, to two or more collection periods; and
- as the timers wake up, performing in parallel two or more tasks corresponding, respectively, to the two or more collection periods.

* * * * *